US009659329B2

(12) United States Patent
Reuter et al.

(10) Patent No.: US 9,659,329 B2
(45) Date of Patent: *May 23, 2017

(54) FOREIGN EXCHANGE TRADING SYSTEM

(71) Applicant: Goldman, Sachs & Co., New York, NY (US)

(72) Inventors: Dierk Reuter, London (GB); Edward Wen, Shelby Township, MI (US)

(73) Assignee: GOLDMAN, SACHS & CO., New York, NY (US)

(*) Notice: Subject to any disclaimer, the term of this patent is extended or adjusted under 35 U.S.C. 154(b) by 236 days.

This patent is subject to a terminal disclaimer.

(21) Appl. No.: 13/951,014

(22) Filed: Jul. 25, 2013

(65) Prior Publication Data
US 2013/0311353 A1 Nov. 21, 2013

Related U.S. Application Data

(63) Continuation of application No. 11/932,301, filed on Oct. 31, 2007, now Pat. No. 8,498,919, which is a continuation of application No. 09/935,257, filed on Aug. 22, 2001, now Pat. No. 7,321,873.

(60) Provisional application No. 60/226,843, filed on Aug. 22, 2000.

(51) Int. Cl.
G06Q 40/04 (2012.01)
G06Q 30/06 (2012.01)
G06Q 40/00 (2012.01)

(52) U.S. Cl.
CPC ......... *G06Q 40/04* (2013.01); *G06Q 30/0605* (2013.01); *G06Q 40/00* (2013.01)

(58) Field of Classification Search
CPC ....... H04L 12/24; H04L 12/14; H04L 47/125; G06Q 40/04; G06Q 40/06; G06Q 30/06; G06Q 40/00
USPC .............. 705/35, 36 R, 37, 38; 370/351, 352
See application file for complete search history.

(56) References Cited

U.S. PATENT DOCUMENTS 5,905,974 A * 5/1999 Fraser et al. ................ 705/36 R
6,058,417 A * 5/2000 Hess et al. .................... 709/219
6,278,982 B1 * 8/2001 Korhammer et al. ...... 705/36 R
(Continued)

OTHER PUBLICATIONS

International Application No. PCT/US2001/026154, International Search Report, Jan. 9, 2002, 1 page.
(Continued)

*Primary Examiner* — Nga B Nguyen

(57) ABSTRACT

Computer-implemented trading of financial products can include using a first communication channel to stream offering data for a plurality of different financial products from a server to a trading terminal. A second communication channel can be used to receive request for offers about ones of the financial products from the trading terminal. Such request can include user-specified parameters that modify or further specify characteristics of the desired products. Offers may then be determined for the product in accordance with the user-specified parameters and transmitted (over the second communication channel) back to the trading terminal. Each communication channel can be allocated a different priority and/or different level of system processing resources to optimize the allocation of system resources based on the criticality of data on each channel.

20 Claims, 4 Drawing Sheets

(56) References Cited

U.S. PATENT DOCUMENTS

| | | | | |
|---|---|---|---|---|
| 6,295,294 B1* | 9/2001 | Odlyzko | ................ | H04L 12/14 370/234 |
| 6,408,282 B1* | 6/2002 | Buist | ........................... | 705/36 R |
| 6,680,934 B1* | 1/2004 | Cain | ...................... | H04L 12/24 370/352 |
| 6,714,532 B1* | 3/2004 | Kawaguchi | ......... | H04L 12/5692 370/351 |
| 6,952,401 B1* | 10/2005 | Kadambi | .............. | H04L 47/125 370/232 |
| 7,310,670 B1* | 12/2007 | Walbeck | ................. | H04B 3/54 709/225 |
| 8,498,919 B2* | 7/2013 | Reuter et al. | ................... | 705/37 |

OTHER PUBLICATIONS

International Application No. PCT/US2001/026154, International Preliminary Examination Report, Jun. 3, 2002, 3 pages.

\* cited by examiner

FOREIGN EXCHANGE TRADING SYSTEM

RELATED APPLICATIONS

The current application is a continuation of U.S. patent application Ser. No. 11/932,301 filed Oct. 31, 2007, entitled "Foreign Exchange Trading System", now allowed, which is a continuation of U.S. patent application Ser. No. 09/935,257 filed on Aug. 22, 2001, entitled "Foreign Exchange Trading System", issued as U.S. Pat. No. 7,321,873, which claims priority to and the benefit of U.S. Provisional Application No. 60/226,843, filed on Aug. 22, 2000, entitled "Foreign Exchange Trading Infrastructure", all of which are incorporated herein by reference in their entirety.

BACKGROUND OF THE INVENTION

Computerized trading system suitable for trading financial products over a public network, such as the Internet, may be challenged to meet stringent delay requirements and quality-of-service objectives for the transmission of trading information. Failing to meet such objectives may result in delayed and outdated pricing information being displayed to traders, as well as frustration and inconvenience for traders and customers. Although all securities trading can be affected by these issues, the trading of over-the-counter (OTC) securities may have particularly sensitivities to such delays. These sensitivities can be increased where pricing information consist of an aggregation of data for multiple OTC securities originating at multiple dealer trading system.

SUMMARY OF THE INVENTION

The present invention includes a computerized method and system for providing streamlined and responsive communications for OTC trading over a distributed network, such as the Internet. For example, after pricing data for a group of financial products is received and displayed at a trading terminal display, a user can click on the 6 month (mth) points of a U.S., dollar/Japanese yen swap (a $/jpy swap) on the market screen, whereby a trade ticket is launched for a 6 mth swap in a separate ticket window. Prior to displaying the ticket window a second internet connection is established to a server sending a request for the price stream corresponding to the 6 mth $/jpy swap in question to all selected provider banks. A bank can stream live executable prices back to the ticket window. The trader can then execute a transaction with the bank preferred by the trader (i.e., the bank offering the most favorable pricing).

In general, in one aspect, the invention features a computer-implemented method for trading financial products. The method includes using a first communication channel to stream offering data for a plurality of different financial products from a server to a trading terminal. A second communication channel is used to receive request for offers about ones of the financial products from the trading terminal. Such request can include user-specified parameters that modify or further specify characteristics of the desired products. Offers may then be determined for the product in accordance with the user-specified parameters and transmitted (over the second communication channel) back to the trading terminal.

Implementations may include one or more of the following features. The offering data may be an aggregate of market data from multiple dealers of over-the-counter financial products and this data can be aggregated at the server prior to its transmission to the trading terminal. Information streamed in the first communication channel can be periodically re-transmitting to enable a display of updated information at the trading terminal. Network transmission conditions and server loading can be monitored, and based on the monitored conditions, the streaming rate can be adjusted.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
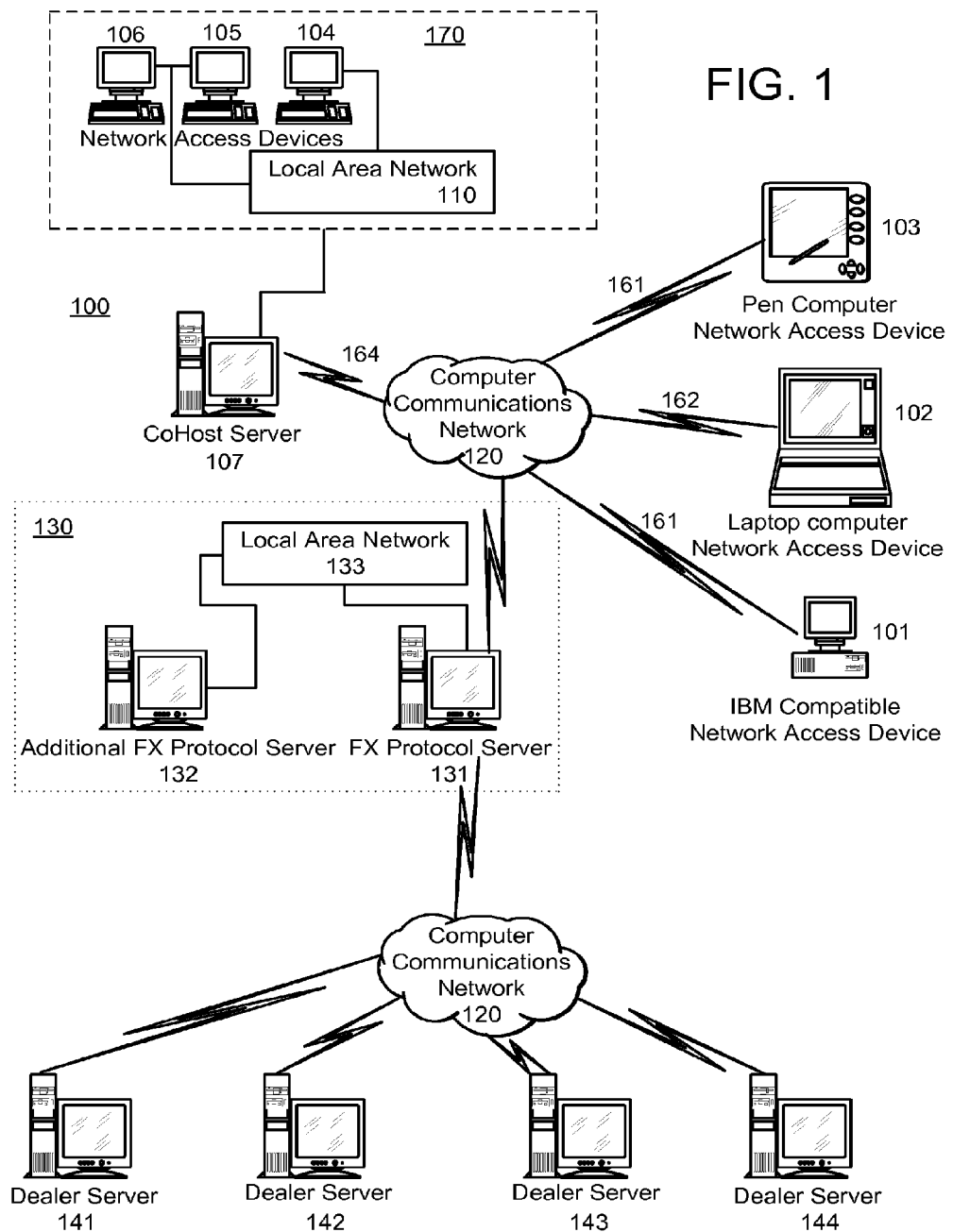
FIG. 1 is a diagram of an exemplary trading system architecture.

The performance of a computerized trading system may be improved by using logically separate communication channels to exchange different types of data. Bandwidth allocation and processing resources can then be optimized for a particular channel so that appropriate system resources are allocated to channels depending on the type of data exchanged on the channel.

A trading system handling OTC trades may separate data into a first channel for indicative data and a second channel for exchange of trading commands ("execution data"). The indicative data channel may be used for the exchange of low-priority data having a relatively high-bandwidth and high delay tolerance. In contrast, the execution data may be for the exchange of high-priority data having a relatively low bandwidth and low delay tolerance.

Indicative data may include bid and offer data for tens or hundreds of foreign exchange (FX) products. These products can consist of exchange traded as well as OTC traded products including, among others, simple options, even currency swaps/roll, outright forwards, uneven swaps, risk reversals, straddles, strangles, derivatives (on touch binaries), and options. For each of the products, there may be different configurations of pre-determined characteristics (such as different value dates or other time periods). Each configuration may, in turn, have a different price associated with it. For example, the indicative data can include the price of a dollar/yen swap at a maturity time periods of six months and another price for the dollar/yen swap at twelve months (along with data for tens or hundreds of other FX product configurations). In many implementations, the indicative data is data that may be sent in substantially the same form to numerous traders.

Execution data, on the other hand, may consist of relatively particularized data —for example, data associated with a particular trader's activity, or exchanged in response to particular inquiries by the trader. Execution data may be generated based a trader's selection of a product identifier displayed at a trading terminal that corresponds to a particular FX product configuration (such an identifier being received on the indicative data channel). For example, when the indicative data is displayed, the trader may select one of the displayed products (say, a foreign exchange swap identified by the symbol "XYZ"), and activate a trading function (i.e., an input window) to change a parameter of that product to a desired value. For example, if the indicative data displayed pricing of "XYZ" for a value date of six months, but not for a three-month date desired by the trader, the trader may modify the data to specify a modified value date three months. Data describing the modified product may then be sent over the execution data channel and processed at a trading server (and, if necessary, relayed to other dealer systems) so that a price can be obtained for the modified product and/or a trade entered for that product. The price is then relayed back to the trading terminal over the execution data channel.

FIG. 1 shows an exemplary trading system architecture using logically separate communication channels between trading terminals and trading servers to exchange different classes of trading data (i.e. indicative data and execution data). The implementation 100 is directed to foreign exchange (FX) trading and includes a FX Protocol system 130 with a FX Protocol Server 131-132. The system 130 can receive and transmit trading data over a communications network 120 such as the Internet. Trading data can be transmitted to a client network access device 101-106 so that a client can view transmitted information which is displayed via graphical user interfaces on the network access devices 101-106. Client inputs can be received into a network access device 101-106 via an input device including an industry standard keyboard, a specialized keyboard or other input device such as a joystick, a mouse, a track ball, a touch pad, or any other interface device which allows a user to control a processing system. Inputs can be transmitted via the communications network 120 to the FX Protocol system 130.

The system 100 includes multiple dealers (each represented by a dealer server 141-144) that are coupled to the FX Protocol System 130 via a communications network 120. Market data (e.g., pricing information) originates at the dealer servers 141-144 and is transmitted to the system 130 where it is aggregated prior to transmission to terminals 101-106. The aggregated market data is then transmitted to terminals 101-106 over an indicative data communication channel through communications network 120. Aggregated market data is one form of indicative data that can be provided to trading terminals, other types of data may also be transmitted over the indicative data channel.

In a preferred implementation, a streaming data channel is used to transmit the indicative data from the server to trading terminals. The particular streaming mechanism may differ depending on the implementation (numerous streaming mechanisms are known in the art). In a hypertext transfer protocol implementation, "streaming" may effectively be provided by a polling mechanism whereby a trading terminal periodically polls a server storing the indicative data. In response to each poll, the server may return pricing data for numerous products. Each poll is automatically initiated (i.e., the trader does not have to activate a "refresh" function to obtain updated data) and serves to update the indicative data displayed at the trading terminal with "fresh" replacement data. Many other streaming and data transmission methods are known and can be used to obtain efficient transmission on the indicative data channel. By way of example, a TCP/IP channel may be opened between each trading terminal and the server 131, remaining open throughout a trading session, and a proprietary protocol used to transmit data. Such a scheme may help reduce overhead processing associated with establishing individual HTTP connections through a network. Another alternative is to constantly transmit indicative data on a broadcast channel, allowing multiple terminals to be recipients of a common broadcast data stream. Such an alternative may help reduce bandwidth usage between the server system 130 and external network 120.

After the market data is displayed at a trading terminal, a trader may select particular products of interest. In response to a client request, a second communication channel can be established between a trading terminal 101-106 and the FX Protocol System 130. This second channel can be used for the exchange of high-priority execution data (including information responsive to product information request (i.e., the most-current pricing information), and offers and bids, and for negotiating prices and parameters of customized product configurations). Request received at system 130 from the terminals 101-106 over this second communication channel can also be forwarded to one or more dealer servers 141-144. The dealer servers 141-144 can respond to the client request with specific pricing or other information via the second connection. In one embodiment, responsive information from the dealers can be aggregated by the FX Protocol System 130 and transmitted to the client for display as one GUI.

A client can execute a trade, or take another appropriate action, based upon the responsive information. Information relating to the trade, or other appropriate action, can be routed, again on the execution channel, through the FX Protocol System 130 to a particular dealer 141-144 to which the information is directed. Depending upon the nature of the information, the FX Protocol System 130 may forward the details relating to the trade information to other dealers 141-144. By using the separate execution channel for the negotiation of specific trades and their execution, parameters of these trades and the fact that a particular trade took place can be kept secret amongst the trade participants (i.e., the information is isolated from any shared information on the indicative data channel). Other actions can also be made public by the FX Protocol System 130, distributed to a finite set of recipients or kept confidential according to predetermined criteria.

If a client decides to change the value date, strike or any other detail of an OTC contract the window sends a message containing the updated contract details to the server 130 immediately upon the client entering the data. The server can publish live executable prices (which may be obtained from dealer servers 141-144) for this contract. The client can execute a custom OTC contract with the bank of choice. A trade can thereby be executed by a client with only two clicks of a pointing device such as a mouse.

In some implementations, the system 130 may route an order, or other request, to an operator if some predetermined criteria are met. For example, if a client wishes to trade an OTC product that falls within a predetermined threshold, then software on the server 130 can calculate a price for the trade and respond to the client automatically via the communications network. However, if a client wishes to trade a volume that exceeds a predetermined threshold, or otherwise meets a criteria programmed into the system, the trade order can be routed to a network access device manned by a human, such as at a traders desk, for manual intervention. A trader at an appropriate center can receive a request in a time efficient manner and make the market for the request. Other criteria that might be programmed into the system can include an event, such as a calendar event, trading event, exceeding a volume threshold amount, a particular client list, a particular product, or any other criteria that would make it beneficial for a human to be involved. For example if the timing is 30 seconds prior to a numbers release, everything may be defaulted to route manually.

Figure 2:
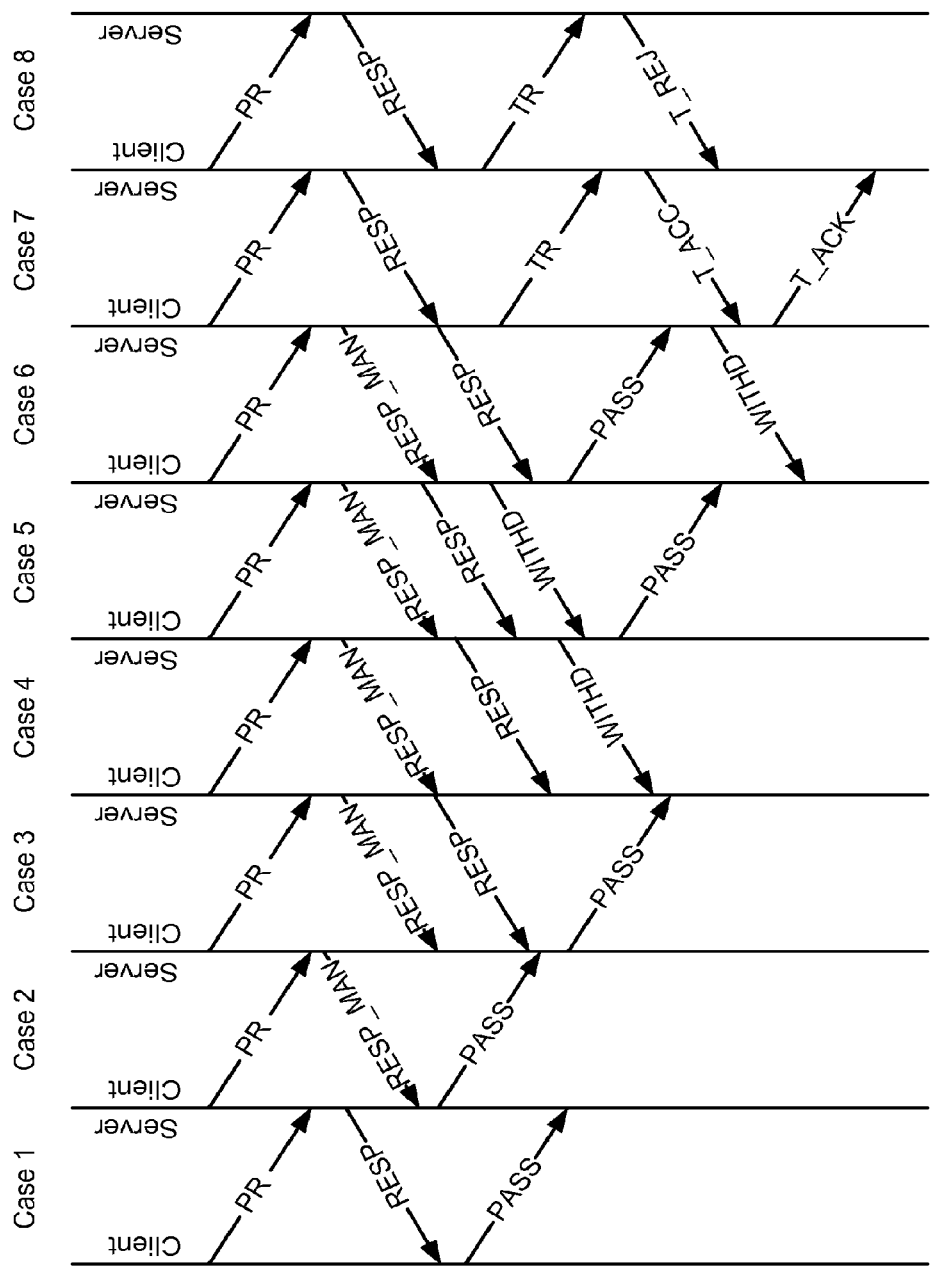
FIG. 2 is a message flow diagram.

FIG. 2 shows example transactions that may be implemented in the system 100 using a messaging protocol suitable for trading of financial products. Each of the messages shown in FIG. 2 is particular to a individual trader and these messages are transmitted over an execution data channel, separate from indicative data. In a full system implementation, other transactions may also be implemented and other protocols can be used. The Financial Information Exchange (FIX) protocol is one industry-standard protocol that can serves as a guideline for implementing a full trading protocol as may be used in a system such as 100. Information on the FIX protocol is available from the FIX Protocol Organization web site at www.fixprotocol.org.

The price messaging protocol can be used to establish a consistent flow of data related to an electronic trade, to eliminate ambiguity relating to a sequence of communications, and to maintain transaction audit information (e.g., by logging the transmission and receipt of information between parties). If any segment of a messaging sequence fails, the protocol log can facilitate rectifying the failure. Examples of various messaging transactions are illustrated in FIG. 2, though numerous other transactions may also be implemented. The following are example message flows for an exemplary trading protocol:

Case 1 illustrates a price request message (PR) sent from a user terminal to a finance institution (i.e., dealer system 141-144) to request a price for a particular product, and an electronic response message (RESP) sent in reply to the request. Typically, the response will include a price quote, although other and additional information can also be sent via the response. An electronic response indicates that the message is generated by a computer system. If the trader is not interested in executing a trade for the product at the quoted price, the trader may send a pass message (PASS) indicating that the trader is not accepting the offer.

Case 2 illustrates a manual response (RESP_MAN) to a price requests. Manual responses can be as a result to routing to a trade desk (such routing may occur according to predetermined criteria or through the intervention of a trader). The manual response can be made via voice, fax, human initiated e-mail, or other communication medium.

Case 3 illustrates that both a manual response and an electronic response can be accomplished without being mutually exclusive. The system 100 can include the ability of a trader to augment an electronic response or otherwise communicate with a client concerning a trade. In this illustration, the client is shown passing on each response.

Case 4 illustrates a manual response and an electronic response (i.e., an offer) which are followed by a withdrawal (WITHD) of the offer. The withdrawal can be an automatically initiated and/or transmitted electronic withdrawal, or can be a manual action taken via voice, fax, e-mail or other communication medium. An automatic withdrawal can be initiated for example in response to the occurrence of an event or triggered by some underlying criteria being met.

Case 5 illustrates logging both a manual and electronic responses and a withdrawal, and also includes a subsequent pass by the client. Case 6 illustrates a subtle, but important change in the sequence of messages can be captured. Case 6 differs from Case 5 in that the client pass is logged prior to the withdrawal of the offer.

Case 7 illustrates a trade message (TR) from the client to the investment institution, following a response to a price request. The investment institution can transmit a trade accept message (T_ACC) indicating that the trade was processed. The client can send a message to acknowledge receipt (T_ACK) of the trade accept message to complete the cycle by notifying the investment bank that they are aware that the trade was successful.

Case 8 illustrates still another sequence wherein a price request is responded to by an investment bank and a trade message is sent following the response. In this case, the trade message is rejected (T_REJ). Rejection might be because a timeout has occurred since the response message was issued, or an intervening event occurred, or for other reasons. Rejections can also be made through manual intervention by a trader. Other sequences and message types are also within the realm of the present invention.

Figure 3:
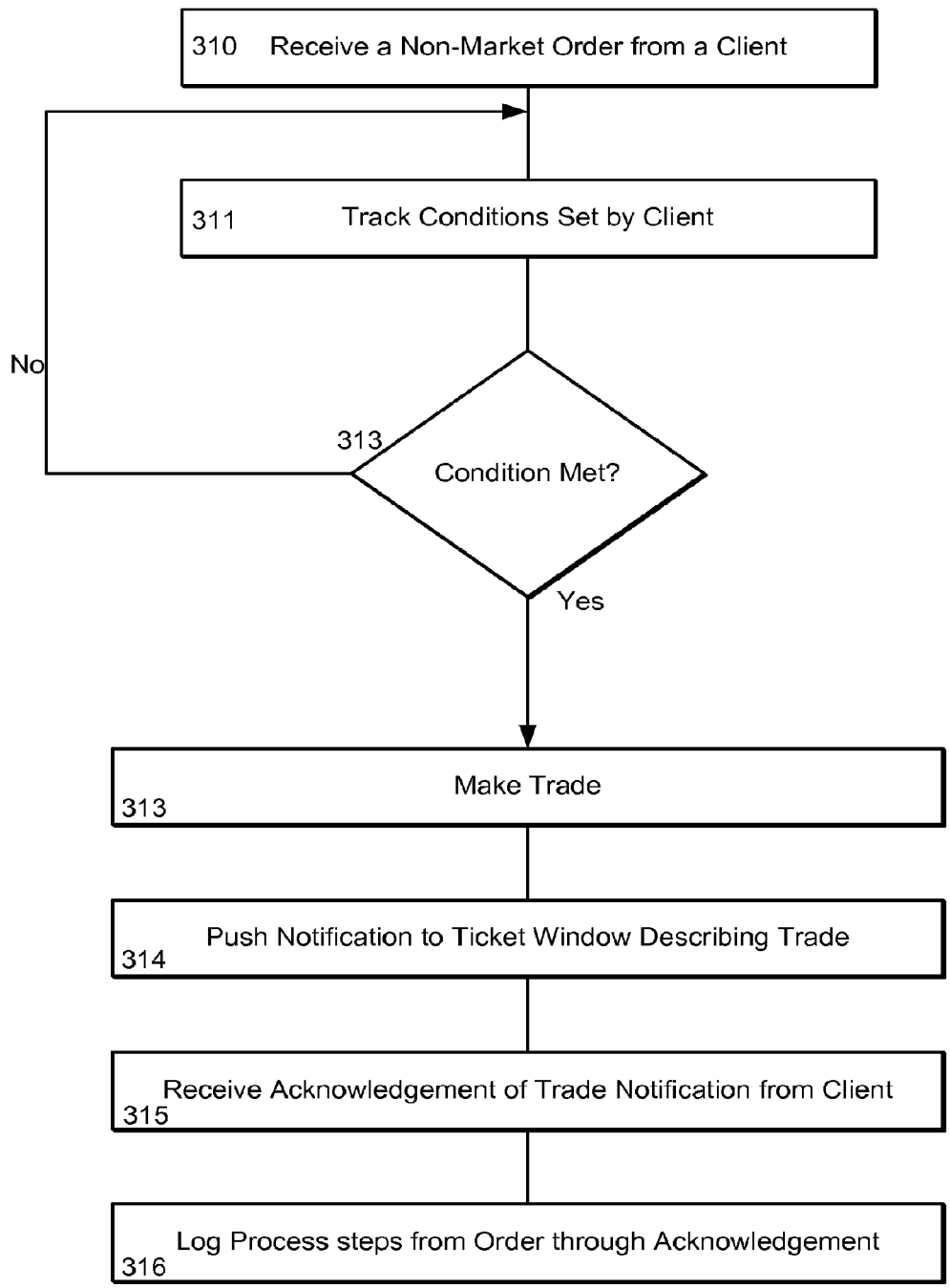
FIG. 3 is an exemplary process flow chart.

In some implementations, the system 100 can push information specific to a client such that only the client, or the client's agent, receives the information. This feature is useful, for example, to notify a client that a non-market order has been executed. Rather than having to check or confirm on order execution, such as is required today, the system can proactively inform the client. The system can automatically pop a message up on a display associated with the client. The message can contain the order confirmation, or any other information which needs to be timely conveyed to the client. FIG. 3 illustrates a method to push information to a client when the FX Protocol System 130 receives a non-market order 310 such as an instruction to sell 10 million dollar/yen if IBM stock reaches $125. Other embodiments can include placing an order based upon other known events, such as reporting results, a calendar event, etc. The FX Protocol System 130 or a live trader can track conditions 311 to monitor if the client's condition is met. If the condition is met, then the trade can be made 313. The trade can be accomplished automatically through an ECN (Electronic Communication Network) or by a trader. Following order execution, a push notification can be sent to the ticket window on the client's network access device 314. The notification can describe the trade as it was executed.

Following receipt of a notification, the client's network access device can then automatically acknowledge receipt of the push notification 315. In another embodiment, acknowledgement of the receipt of the notification 315 can be manually initiated by the client, or the client's representative. As each step of the method is completed a log can be constructed to provide a history of events 316. Customized confirmation routing can also be used such that the confirmation is routed to a back office system, a clearing house system, or any other destination designated by the client.

An example of client specific information push would include a client placing an order for dollar/yen if dollar/yen hits a target price, such as 106.35. Once the investment institution is able to meet the order, the system would transmit a message through the trade ticket stream that notifies the client that the trade took place. The client does not need to take my action to receive the notification. If it is otherwise desired, the message can also be sent via a connection different than the trade ticket connection. This system also gives a client the ability to leave contingent/inter-related orders (orders which can be triggered on an an-related asset price movement) and the ability to leave orders on forwards, swaps or options.

Figure 4:
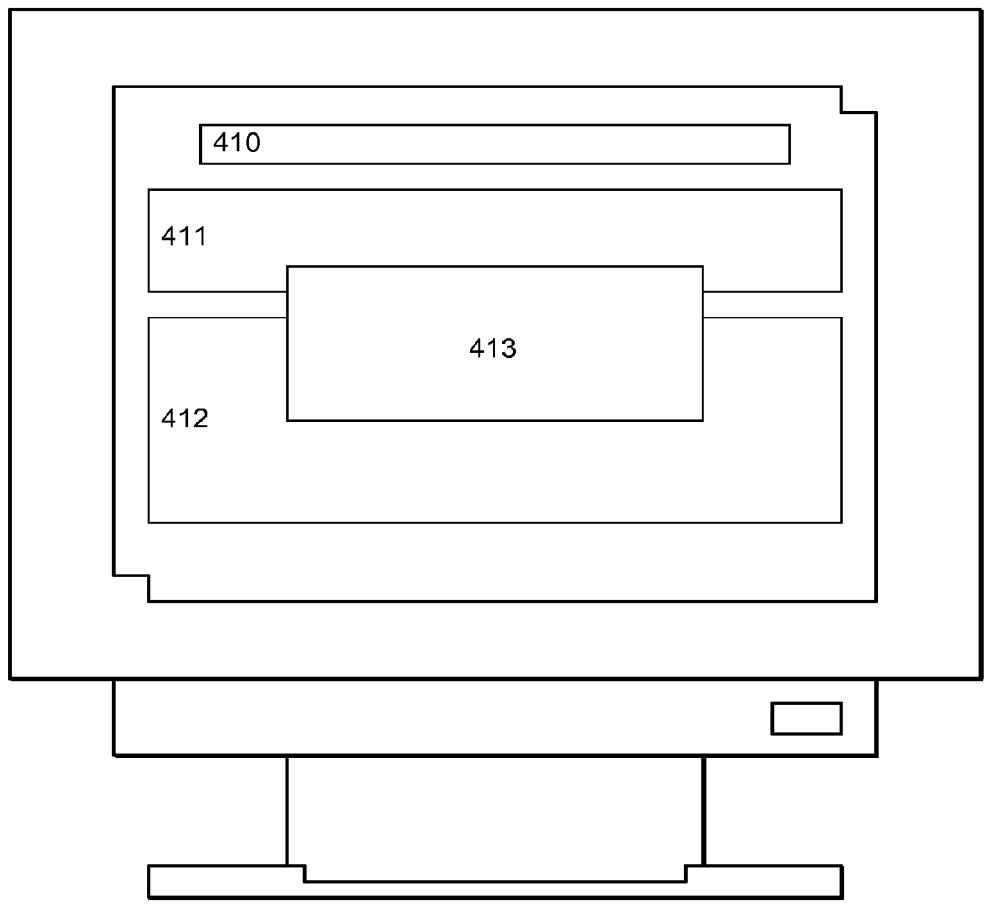
FIG. 4 is a mock-up of a terminal display screen.

Referring now to FIG. 4, a graphical user interface that can be implemented at a trading terminal in conjunction with the present invention is shown. The display 400 is divided into multiple geographic areas 410-413, each having a different function. For example, one area 410 can include functionality related to identification of the FX Protocol provider and/or the client accessing the system. Another area 411 can include display information received over the indicative data channel showing various products or listings, such as currencies, with descriptive information such as date, bid, offer, market price, etc. Another area 412 may contain research information. Still another area can contain a ticket window 413 for streaming information in a timely fashion as discussed above. In some cases, research analysis results displayed in the research window 412 can have trading triggers embedded within it. Typically, research analysis such as research reports, or publications of certain trade ideas can be made available on a network, such as the internet. A client can access research analysis via a WEB site. In this aspect of the invention, a programmable interactive device, such as an icon or a link, can allow a client to proceed directly to a trade ticket window for the product being researched. For example, if a client is researching dollar/yen, a programmable button on the research screen can be activated with a mouse click to open a trade ticket window for dollar/yen. A price would come back to the client in real time and display in the trade ticket window. The client could then execute the trade in the trade ticket window. Using this aspect, a trade can be accomplished by a client with only two clicks of a network access input device displaying a graphical user interface.

A number of embodiments of the present invention have been described. Nevertheless, it will be understood that various modifications may be made without departing from the spirit and scope of the invention. For example, the computer communications network 120 can be one contiguous network, such as the Internet, or multiple smaller networks tied together, such as Intranets. In addition, trading terminals 104-106 can be accessed through a cohost server 107, or utilize a private network. Accordingly, other embodiments are within the scope of the following claims.

What is claimed is:

1. A computer-implemented method for trading financial products, the method comprising:
   streaming, via a server, indicative data to a trading terminal in a first communication channel;
   receiving a request, related to a selection of at least some of the indicative data, from the trading terminal to establish a second communication channel for high priority data including execution data related to the at least some of the indicative data;
   responsive to receiving the request, establishing, via the server, the second communication channel, wherein the second communication channel is logically separate from the first communication channel, and wherein the second communication channel is operable to allow an exchange of the high priority data;
   transmitting the request to a dealer server;
   receiving, via the server from the dealer server, a response to the request, the response including the execution data;
   transmitting the response to the trading terminal through the second communication channel; and
   receiving, via the server through the second communication channel from the trading terminal, instructions to place an order in response to a user-specified event.

2. The method of claim 1, wherein streaming the indicative data comprises:
   transmitting offering data for a plurality of different financial products from the server to the trading terminal.

3. The method of claim 1 wherein streaming the indicative data comprises:
   streaming offering data for a financial product including one or more of:
      a simple option;
      an even currency swap;
      an even currency roll;
      an outright forward;
      an uneven swap;
      a risk reversal;
      a straddle;
      a strangle;
      a derivative; or
      an option.

4. The method of claim 1, wherein receiving the execution data comprises:
   receiving, from the dealer server, information related to the indicative data.

5. The method of claim 1, further comprising:
   receiving offering data comprising market data from a plurality of dealers; and
   aggregating the market data, wherein the aggregated market data is included with the indicative data.

6. A non-transitory computer-readable medium having a set of computer-readable instructions stored thereon that, when executed, perform acts comprising:
   transmitting, to a trading terminal, a stream of offering data for a plurality of different financial products over a first communication channel;
   receiving a request, related to a selection of at least some of the offering data, from the trading terminal to establish a second communication channel for high priority data including execution data related to the at least some of the offering data;
   responsive to receiving the request, establishing the second communication channel, wherein the second communication channel is logically separate from the first communication channel, and wherein the second communication channel is operable to allow an exchange of the high priority data;
   transmitting the request to a dealer server;
   receiving, from the dealer server, a response to the request, the response including the execution data;
   transmitting the response to the trading terminal through the second communication channel; and
   receiving, through the second communication channel, instructions to place an order in response to a user-specified event.

7. The non-transitory computer-readable medium of claim 6, wherein transmitting the stream of the offering data includes allowing the trading terminal to periodically poll a server for the offering data.

8. The non-transitory computer-readable medium of claim 7, wherein the periodic polling is automatically initiated.

9. The non-transitory computer-readable medium of claim 6, wherein establishing the second communication channel includes establishing the second communication channel between the trading terminal and a server.

10. The non-transitory computer-readable medium of claim 9, wherein the facilitating establishing the second communication channel includes configuring the second communication channel to accommodate the execution data having a low bandwidth and a low delay tolerance.

11. The method of claim 1, wherein streaming the indicative data comprises constantly streaming the indicative data on a broadcast channel, allowing multiple terminals to receive a common broadcast data stream.

12. The method of claim 1, wherein streaming the indicative data comprises allowing the trading terminal to periodically poll the server for the indicative data.

13. The method of claim 12, wherein the polling is automatically initiated.

14. The method of claim 1, wherein the second communication channel is established between the trading terminal and a foreign exchange (FX) protocol system through the server.

15. The method of claim 1, wherein the response is received through the second communication channel.

16. The method of claim 1, wherein establishing the second communication channel comprises configuring the second communication channel to accommodate the execution data comprising a low bandwidth and a low delay tolerance.

17. The method of claim 1, further comprising:
   aggregating the execution data from a plurality of dealer servers; and
   transmitting the aggregated execution data to the trading terminal for display as one graphical user interface.

18. The method of claim 1, wherein another communication channel is established between the dealer server and a foreign exchange (FX) protocol system.

19. The non-transitory computer-readable medium of claim 6, wherein the set of computer-readable instructions, when executed, further perform acts comprising:
   aggregating the execution data from a plurality of dealer servers; and
   transmitting the aggregated execution data to the trading terminal for display as one graphical user interface.

20. The non-transitory computer-readable medium of claim 6, wherein the set of computer-readable instructions, when executed, further perform acts comprising:
   establishing another communication channel between the dealer server and a foreign exchange (FX) protocol system.

* * * * *